United States Patent
Ozcan et al.

(10) Patent No.: US 12,106,552 B2
(45) Date of Patent: Oct. 1, 2024

(54) METHOD AND SYSTEM FOR DIGITAL STAINING OF LABEL-FREE PHASE IMAGES USING DEEP LEARNING

(71) Applicant: THE REGENTS OF THE UNIVERSITY OF CALIFORNIA, Oakland, CA (US)

(72) Inventors: Aydogan Ozcan, Los Angeles, CA (US); Yair Rivenson, Los Angeles, CA (US); Zhensong Wei, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 600 days.

(21) Appl. No.: 17/261,542

(22) PCT Filed: Mar. 29, 2019

(86) PCT No.: PCT/US2019/025014
§ 371 (c)(1),
(2) Date: Jan. 19, 2021

(87) PCT Pub. No.: WO2020/018154
PCT Pub. Date: Jan. 23, 2020

(65) Prior Publication Data
US 2021/0264214 A1  Aug. 26, 2021

Related U.S. Application Data

(60) Provisional application No. 62/700,792, filed on Jul. 19, 2018.

(51) Int. Cl.
*G06V 10/82* (2022.01)
*G06F 18/214* (2023.01)
(Continued)

(52) U.S. Cl.
CPC .......... *G06V 10/82* (2022.01); *G06F 18/2148* (2023.01); *G06F 18/2155* (2023.01);
(Continued)

(58) Field of Classification Search
CPC .............. G06V 20/693; G06F 18/2148; G06F 18/2155; G06N 3/08
See application file for complete search history.

(56) References Cited

U.S. PATENT DOCUMENTS 9,971,966 B2   5/2018  Nelson et al.
10,824,847 B2  11/2020  Wu
(Continued)

FOREIGN PATENT DOCUMENTS

CN   1556379 A    12/2004
CN   102575990 A   7/2012
(Continued)

OTHER PUBLICATIONS

"On the use of deep learning for computational imaging", Optica, Jul. 25, 2019, Barbastathis et al. (hereinafter Barbastathis).*
(Continued)

*Primary Examiner* — Qun Shen
(74) *Attorney, Agent, or Firm* — VISTA IP LAW GROUP LLP

(57) ABSTRACT

A deep learning-based digital staining method and system are disclosed that provides a label-free approach to create a virtually-stained microscopic images from quantitative phase images (QPI) of label-free samples. The methods bypass the standard histochemical staining process, saving time and cost. This method is based on deep learning, and uses a convolutional neural network trained using a generative adversarial network model to transform QPI images of an unlabeled sample into an image that is equivalent to the brightfield image of the chemically stained-version of the
(Continued)

same sample. This label-free digital staining method eliminates cumbersome and costly histochemical staining procedures, and would significantly simplify tissue preparation in pathology and histology fields.

17 Claims, 11 Drawing Sheets

(51) Int. Cl.
  G06N 3/08 (2023.01)
  G06V 10/764 (2022.01)
  G06V 20/69 (2022.01)
(52) U.S. Cl.
  CPC ............. *G06N 3/08* (2013.01); *G06V 10/764* (2022.01); *G06V 20/693* (2022.01); *G06V 20/698* (2022.01)

(56) References Cited

U.S. PATENT DOCUMENTS

| | | | |
|---|---|---|---|
| 11,354,804 | B1 | 6/2022 | Behrooz |
| 11,403,735 | B2 | 8/2022 | Gao |
| 2004/0093166 | A1 | 5/2004 | Kil |
| 2011/0074944 | A1 | 3/2011 | Can et al. |
| 2011/0206262 | A1* | 8/2011 | Sammak .............. G06V 10/764 382/133 |
| 2012/0083678 | A1 | 4/2012 | Drauch et al. |
| 2013/0077875 | A1 | 3/2013 | Levenson et al. |
| 2013/0162800 | A1* | 6/2013 | Kim ........................ G02B 21/14 348/79 |
| 2013/0317369 | A1 | 11/2013 | Bryant-Greenwood |
| 2014/0221813 | A1 | 8/2014 | Bryant-Greenwood |
| 2014/0270457 | A1 | 9/2014 | Bhargava |
| 2014/0375792 | A1* | 12/2014 | Yaqoob ................ G01N 21/453 348/79 |
| 2015/0119722 | A1 | 4/2015 | Kaneko |
| 2015/0226743 | A1 | 8/2015 | Weiss |
| 2016/0077007 | A1 | 3/2016 | Demos et al. |
| 2016/0196648 | A1 | 7/2016 | Madabhushi |
| 2017/0052106 | A1 | 2/2017 | Hennig et al. |
| 2017/0191937 | A1 | 7/2017 | Levenson |
| 2017/0249548 | A1 | 8/2017 | Nelson et al. |
| 2017/0343477 | A1 | 11/2017 | Santori |
| 2017/0343784 | A1 | 11/2017 | Wu |
| 2018/0012356 | A1 | 1/2018 | Madabhushi |
| 2018/0028079 | A1 | 2/2018 | Gurevich et al. |
| 2018/0064409 | A1* | 3/2018 | Schmidt-Richberg ....................... G06V 10/25 |
| 2018/0286038 | A1 | 10/2018 | Jalali |
| 2019/0188446 | A1 | 6/2019 | Wu |
| 2019/0251330 | A1* | 8/2019 | Cotte ........................ G01N 1/30 |
| 2019/0266486 | A1* | 8/2019 | Yamada .................. G06V 10/56 |
| 2019/0333199 | A1 | 10/2019 | Ozcan |
| 2019/0384047 | A1* | 12/2019 | Johnson .................. G06T 7/187 |
| 2019/0392580 | A1* | 12/2019 | Kapil ................... G06V 20/695 |
| 2020/0066407 | A1* | 2/2020 | Stumpe .................. G06N 3/045 |
| 2020/0106932 | A1* | 4/2020 | Chou ...................... H04N 23/51 |
| 2020/0372635 | A1* | 11/2020 | Veidman ................ G06V 20/69 |
| 2020/0394825 | A1* | 12/2020 | Stumpe ................. G06F 18/214 |
| 2023/0030424 | A1 | 2/2023 | Ozcan |

FOREIGN PATENT DOCUMENTS

| | | |
|---|---|---|
| EP | 2921990 A2 | 9/2015 |
| WO | WO 2013/187148 | 12/2013 |
| WO | WO 2017/053592 | 3/2017 |
| WO | WO 2017/196885 | 11/2017 |
| WO | WO 2018/165590 | 9/2018 |
| WO | WO 2020/018154 | 1/2020 |

OTHER PUBLICATIONS

"Quantitative Phase Imaging and Artificial Intelligence: A Review", IEEE J. of Selected Topics in Quantum Electronics, vol. 25, No. 1, Jan./Feb. 2019, Jo et al.*

"On the use of deep learning for computational imaging", Optica, Aug. 2019, George Barbastathis et al.*

PCT Notification of Transmittal of the International Search Report and Written Opinion for PCT/US2019/021471, mailed Jun. 19, 2019, 7 pages.

Bayramoglu et al., Towards Virtual H&E Staining of Hyperspectral Lung Histology Images Using Conditional Generative Adversarial Networks, 2017 IEEE International Conference on Computer Vision Workshops (ICCVW). Retrieved on May 30, 2019. Retrieved from the internet <URL:https://ieeexplore.ieee.org/document/8265226>.

Rivenson et al., Deep Learning-based virtual histology staining using auto-fluorescence of label-free tissue, Nature Biomedical Engineering (2019). Retrieved on May 24, 2019.Retrieved from: <URL:https://arxiv.org/abs/1803.11293>.

Croce et al., Autofluorescence spectroscopy and imaging: a tool for biomedical research and diagnosis, European Journal of Histochemistry 2014; vol. 58:2461.

Fereidouni et al., Microscopy with ultraviolet surface excitation for rapid slide-free histology, Nat Biomed Eng. 2017; 1:957-966.

Giacomelli et al., (2016) Virtual Hematoxylin and Eosin Transillumination Microscopy Using Epi-Fluorescence Imaging. PLoS ONE 11(8):e0159337. Doi:10.1371/journal.pone.0159337.

Glaser et al., Light-sheet microscopy for slide-free non-destructive pathology of large clinical specimens, Nat Biomed Eng. Jul. 2017; 1(7): doi:10.1038/s41551-017-0084.

Goodfellow et al., Generative Adversarial Nets, http://www.github.com/goodfeli/adversarial, Jun. 10, 2014.

Hamel et al., Transfer Learning in MIR: Sharing Learned Latent Representations for Music Audio Classification and Similarity, 2013 International Society for Music Information Retrieval.

He et al., Deep Residual Learning for Image Recognition, arXiv:1512.03385v1 [cs.CV] Dec. 10, 2015.

He et al., Identity Mappings in Deep Residual Networks, arXiv:1603.05027v3 [cs.CV] Jul. 25, 2016.

Jamme et al., DUV Autofluorescence Microscopy for Cell Biology and Tissue Histology Biology of the Cell Biology of the Cell, Biology of the Cell, Wiley, 2013, 105 (7), pp. 277-288. 10.1111/boc.201200075. hal-01485578.

Ji et al., Rapid, label-free detection of brain tumors with stimulated Raman scattering microscopy, Sci Transl Med. Sep. 4, 2013; 5(201): 201ra119. doi:10.1126/scitranslmed.3005954.

Kingma et al., Adam: A Method for Stochastic Optimization, arXiv:1412.6980v9 [cs.LG] Jan. 30, 2017.

Liu et al., Detecting Cancer Metastases on Gigapixel Pathology Images, arXiv:1703.02442v2 [cs.CV] Mar. 8, 2017.

Lowe, Distinctive Image Features from Scale-Invariant Keypoints, Accepted for publication in the International Journal of Computer Vision, 2004.

Lu et al., Label-free DNA imaging in vivo with stimulated Raman scattering microscopy, 11624-11629, PNAS, Sep. 15, 2015, vol. 112, No. 37, www.pnas.org/cgi/doi/10.1073/pnas.1515121112.

Monici, Cell and tissue autofluorescence research and diagnostic application, Biotechnology Annual Review, vol. 11, ISSN: 1387-2656, DOI: 10.1016/S1387-2656(05)11007-2.

Rivenson et al., Phase recovery and holographic image reconstruction using deep learning in neural networks, Light: Science & Applications (2018) 7, 17141; doi:10.1038/lsa.2017.141.

Rivenson et al., Deep learning enhanced mobile-phone microscopy, (2017).

Rivenson et al., Deep Learning Microscopy, (2017).

Ronneberger et al., U-Net: Convolutional Networks for Biomedical Image Segmentation, arXiv: 1505.04597v1 [cs.CV] May 18, 2015; http://lmb.informatik.uni-freiburg.de/.

Tao et al., Assessment of breast pathologies using nonlinear microscopy, 15304-15309, PNAS, Oct. 28, 2014, vol. 111, No. 43, www.pnas.org/cgi/doi/10.1073/pnas.1416955111.

(56) References Cited

OTHER PUBLICATIONS

Torr et al., Mlesac: A New Robust Estimator with Application to Estimating Image Geometry, Computer Vision and Image Understanding 78, 138-156 (2000), doi:10.1006/cviu.1999.0832, available online at http://www.idealibrary.com.
Tu et al., Stain-free histopathology by programmable supercontinuum pulses, Nat Photonics. Aug. 2016 ; 10(8): 534-540. doi:10.1038/nphoton.2016.94.
Vacoc et al., Three-dimensional microscopy of the tumor microenvironment in vivo using optical frequency domain maging, Nat Med. Oct. 2009 ; 15(10): 1219-1223. doi:10.1038/nm.1971.
Witte et al., Label-free live brain imaging and targeted patching with third-harmonic generation microscopy, 5970-5975, PNAS, Apr. 12, 2011, vol. 108, No. 15, www.pnas.org/cgi/doi/10.1073/pnas.1018743108.
Wu et al., Extended depth of field in holographic image reconstruction using deep learning based auto-focusing and phase recovery, arXiv1803.08138 Mar. 2018.
PCT Notification of Transmittal of the International Search Report and Written Opinion for PCT/US2019/025014, mailed Jun. 11, 2019, 9 pages.
PCT International Preliminary Report on Patentability (Chapter I of the Patent Cooperation Treaty) for PCT/US2019/025020, Applicant: The Regents of the University of California, Form PCT/IB/326 and 373, dated Oct. 15, 2020 (6 pages).
Notification of the First Office Action dated Nov. 4, 2023 for Chinese Patent Appl No. 2019800291722, (40 pages).
Neslihan Bayramoglu et al., Towards Virtual H&E Staining of Hyperspectral Lung Histology Images Using Conditional Generative Adversarial Networks, Proceedings of the IEEE International Conference on Computer (2017).
Response to Chinese First Office Action dated May 20, 2024 for Chinese Patent Appl No. 2019800291722, English translations is only for pending claims (18 pages).
Communication regarding the Extended European Search Report dated May 7, 2021 for European Patent Appl No. 19776693.4, (8 pages).
Communication pursuant to Rules 70(2) and 70a(2) EPC dated May 26, 2021 for European Patent Appl No. 19776693.4, (1 pages).
Erik A. Burlingame et al., SHIFT: speedy histopathological-to-immunofluorescent translation of whole slide images using conditional generative adversarial networks, Proc. of SPIE, vol. 10581, pp. 1058105-1, XP060104313, (Mar. 6, 2018).
Liang Han et al., Transferring Microscopy Image Modalities with Conditional Generative Adversarial Networks, IEEE Conference on Computer Vision and Pattern Recognition Workshops (CVPRW), IEEE, (Jul. 21, 2017), pp. 851-859, XP033145860.
Response to the Extended European Search Report dated Dec. 2, 2021 for European patent application 19776693.4, (16 pages).
First Examination Report pursuant to Article 94(3) EPC dated Feb. 27, 2023 for European patent application 19776693.4, (8 pages).
Sinno Jialin et al., A Survey on Transfer Learning, IEEE Transactions on Knowledge and Data Engineering, vol. 22, No. 10, pp. 1345-1359, (Oct. 2010).
Response to First Examination Report pursuant to Article 94(3) EPC dated Jul. 10, 2023 for European patent application 19776693.4, (16 pages).
First Examination Report (FER) dated Jul. 14, 2022 for Indian Patent Appl No. 202037045753, (7 pages).
Response to First Examination Report (FER) dated Oct. 13, 2022 for Indian Patent Appl No. 202037045753, (25 pages).
First Examination Report dated Jan. 24, 2023 for Japanese Patent Appl No. 2020-552396, (8 pages).
Response to First Examination Report dated Apr. 21, 2023 for Japanese Patent Appl No. 2020-552396, (20 pages); English translations for pending claims only.
Notice of Allowance dated Aug. 1, 2023 for Japanese Patent Appl No. 2020-552396, (5 pages).
Office Action dated Sep. 1, 2023 for U.S. Appl. No. 17/041,447, (32 pages).
Response Office Action dated Nov. 8, 2023 for U.S. Appl. No. 17/041,447, (29 pages).
Notice of Allowance dated Nov. 29, 2023 for U.S. Appl. No. 17/041,447, (19 pages).
Notification of the First Office Action dated Nov. 4, 2023, for Chinese Patent Application No. 2019800291722, (40 pages).
Response to First Office Action dated May 20, 2024, for Chinese Patent Application No. 2019800291722, (English translations for Claims only) (18 pages).

* cited by examiner

METHOD AND SYSTEM FOR DIGITAL STAINING OF LABEL-FREE PHASE IMAGES USING DEEP LEARNING

RELATED APPLICATION

This Application is a U.S. National Stage filing under 35 U.S.C. § 371 of International Application No. PCT/US2019/025014, filed Mar. 29, 2019, which claims priority to U.S. Provisional Patent Application No. 62/700,792 filed on Jul. 19, 2018, which is hereby incorporated by reference. Priority is claimed pursuant to 35 U.S.C. § 119 and any other applicable statute.

TECHNICAL FIELD

The technical field generally relates to methods and systems used to image unstained tissue. In particular, the technical field relates to microscopy methods and systems that utilize deep neural network learning for digitally or virtually staining of images of unstained or unlabeled tissue. Deep learning in neural networks, a class of machine learning algorithms, are used to digitally stain images of label-free tissue sections into images that are equivalent to microscopy images of the same samples that are stained or labelled.

BACKGROUND

Quantitative phase imaging (QPI) is a label-free imaging technique, which generates a quantitative image of the optical-path-delay through the specimen. Other than being label-free, QPI utilizes low-intensity illumination, while still allowing a rapid imaging time, which reduces phototoxicity in comparison to e.g., commonly-used fluorescence imaging modalities. QPI can be performed on multiple platforms and devices, from ultra-portable instruments all the way to custom-engineered systems integrated with standard microscopes, with different methods of extracting the quantitative phase information. QPI has also been recently used for the investigation of label-free thin tissue sections, which can be considered as a weakly scattering phase object, having limited amplitude contrast modulation under brightfield illumination. Although QPI techniques result in quantitative contrast maps of label-free objects, the current clinical and research gold standard is still mostly based on brightfield imaging of histochemically labeled samples. The staining process dyes the specimen with colorimetric markers, revealing cellular and sub-cellular morphological information of the sample under brightfield microscopy.

SUMMARY

In one embodiment, a system and method are provided that utilizes a trained deep neural network that is used for the digital or virtual staining of label-free thin tissue sections using their quantitative phase images. For this image transformation between the phase image of a label-free sample and its corresponding stained brightfield equivalent image, which is sometimes termed "PhaseStain" herein, a deep neural network was trained using the Generative Adversarial Network (GAN) framework. Once trained, PhaseStain deep neural network provides an image that is the digital or virtual equivalent of a brightfield image of the same sample if the sample were subject to a chemical staining process and imaging. Stated differently, the system and method transform the phase image of a weakly scattering object (e.g., a label-free thin tissue section, which exhibits low amplitude modulation under visible light) into amplitude object information, presenting the same color features that are observed under a brightfield microscope after the chemical staining process. The success of the PhaseStain approach was experimentally demonstrated using label-free sections of human skin, kidney and liver tissue that were imaged by a holographic microscope, matching the brightfield microscopy images of the same tissue sections stained with H&E, Jones' stain, and Masson's trichrome stain, respectively.

Deep learning-based digital/virtual staining of label-free tissue samples using quantitative phase images provide another important example of the unique opportunities enabled by data-driven image transformations. The PhaseStain framework described herein enables the use of label-free imaging techniques for clinical applications and biomedical research, helping to eliminate the need for chemical staining, reduce sample preparation associated time, as well as reduce labor and related costs.

In one embodiment, a microscopy method for label-free samples (e.g., tissue sections) includes the operations of providing a trained deep neural network that is executed by image processing software using one or more processors. A quantitative phase microscopy image of the label-free tissue section is obtained and input to the trained deep neural network. The trained deep neural network outputs a digitally stained output image (e.g., a virtually stained image) of the sample (e.g., tissue section) that is substantially equivalent to a corresponding brightfield image of the same sample that has been chemically stained or otherwise labeled. The method may also be used digitally staining other types of samples besides label-free tissue sections. This may include, for example, biological or environmental samples with small objects contained therein such as a sample with cells, cellular organelles, and the like. The sample may also include smears of biological fluids or tissue. These include, for instance, blood smears, Papanicolaou or Pap smears.

In another embodiment, a system for outputting digitally stained images of sample (e.g., tissue section) obtained by a quantitative phase microscope device is disclosed. The system includes a computing device having image processing software executed thereon, the image processing software executing a trained deep neural network that is executed using one or more processors of the computing device. The trained deep neural network is trained with one or more ground truth images of a chemically stained sample along with a corresponding training set of label-free images obtained from the quantitative phase microscope device that are used to set or fine tune parameters of the deep neural network. The image processing software is configured to receive a quantitative phase microscopy image of the label-free sample and output a digitally stained output image of the sample (e.g., tissue section) that is substantially equivalent to a corresponding brightfield image of the same sample that has been chemically stained.

DETAILED DESCRIPTION OF THE ILLUSTRATED EMBODIMENTS

Figure 1:
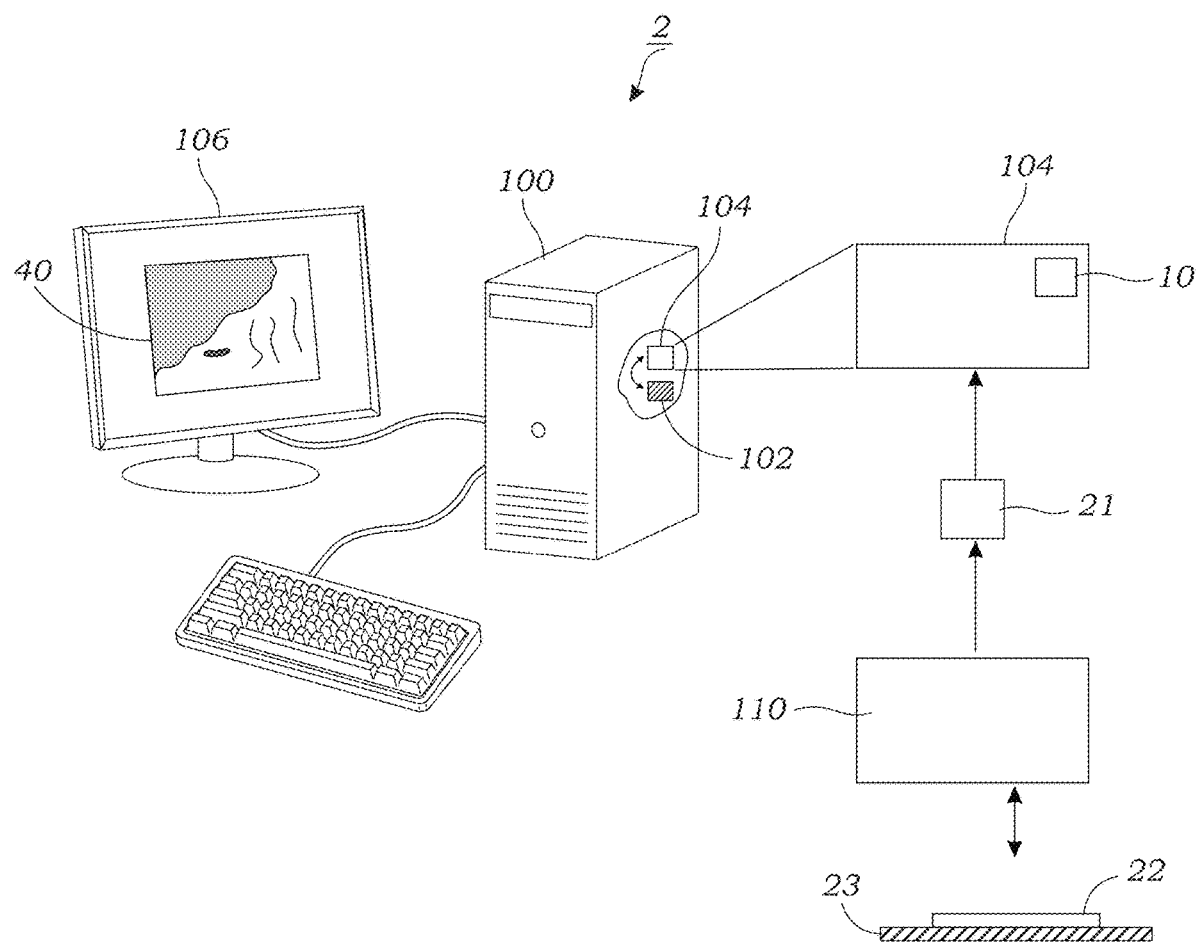
FIG. 1 schematically illustrates a system that is used to generate a digitally/virtually stained output image of a sample from an unstained microscope image of the sample according to one embodiment.

FIG. 1 schematically illustrates one embodiment of a system 2 for outputting digitally stained images 40 from an input microscope image 21 of a sample 22. As explained herein, the input image 21 may include a quantitative phase image 21. QPI is a label-free imaging technique, which generates a quantitative image of the optical-path-delay through the sample 22. The system includes a computing device 100 that contains one or more processors 102 therein and image processing software 104 that incorporates the trained, deep neural network 10 (e.g., a convolutional neural network as explained herein in one or more embodiments). The computing device 100 may include, as explained herein, a personal computer, mobile computing device, laptop, remote server, or the like, although other computing devices may be used (e.g., devices that incorporate one or more graphic processing units (GPUs)) or other application specific integrated circuits (ASICs). GPUs or ASICs can be used to accelerate training as well as final image output. The computing device 100 may be associated with or connected to a monitor or display 106 that is used to display the digitally stained images 40. In one preferred embodiment, the trained, deep neural network 10 is a Convolution Neural Network (CNN). The display 106 may be used to display a Graphical User Interface (GUI) that is used by the user to display and view the digitally stained images 40. In one embodiment, the user may be able to trigger or toggle manually between multiple different digital/virtual stains for a particular sample 22 using, for example, the GUI. Alternatively, the triggering or toggling between different stains may be done automatically by the computing device 100. In one preferred embodiment, the trained, deep neural network 10 is a Convolution Neural Network (CNN).

For example, in one preferred embodiment as is described herein, the trained, deep neural network 10 is trained using a GAN model. In a GAN-trained deep neural network 10, two models are used for training. A generative model is used that captures data distribution while a second model estimates the probability that a sample came from the training data rather than from the generative model. Details regarding GAN may be found in Goodfellow et al., Generative Adversarial Nets, Advances in Neural Information Processing Systems, 27. pp. 2672-2680 (2014), which is incorporated by reference herein. Network training of the deep neural network 10 (e.g., GAN) may be performed the same or different computing device 100. For example, in one embodiment a personal computer may be used to train the GAN although such training may take a considerable amount of time. To accelerate this training process, one or more dedicated GPUs may be used for training. As explained herein, such training and testing was performed on GPUs obtained from a commercially available graphics card. Once the deep neural network 10 has been trained, the deep neural network 10 may be used or executed on a different computing device 110 which may include one with less computational resources used for the training process (although GPUs may also be integrated into execution of the trained deep neural network 10).

The image processing software 104 can be implemented using Python and TensorFlow although other software packages and platforms may be used. The trained deep neural network 10 is not limited to a particular software platform or programming language and the trained deep neural network 10 may be executed using any number of commercially available software languages or platforms. The image processing software 104 that incorporates or runs in coordination with the trained, deep neural network 10 may be run in a local environment or a remove cloud-type environment. In some embodiments, some functionality of the image processing software 104 may run in one particular language or platform (e.g., image normalization) while the trained deep neural network 10 may run in another particular language or platform. Nonetheless, both operations are carried out by image processing software 104.

As seen in FIG. 1, the trained, deep neural network 10 receives a single quantitative phase image (QPI) hologram intensity image 21 of an unlabeled sample 22. The trained, deep neural network 10 is trained specific to the type of input image. The images 21 are obtained using an imaging device 110 such as a quantitative phase microscope device 110. The quantitative phase microscope device 110 may be lens-free or use lenses. In some embodiments, the quantitative phase microscope device 110 may generate computational microscopy images or holographic microscopy images. The quantitative phase microscopy image 21 may, in some embodiments, be obtained by using pixel super-resolution (PSR) techniques with the phase recovery being performed using multiple height images as described herein. The high-resolution reconstruction can be propagated to the object plane(s) with the phase component extracted for the quantitative phase microscopy image 21 which is input to the trained deep neural network 10.

The sample 22 may include a portion of tissue that is disposed on or in a substrate 23. The substrate 23 may include an optically transparent substrate in some embodiments (e.g., a glass or plastic slide or the like). The sample 22 may include a tissue sections that are cut into thin sections using a microtome device or the like. Thin sections of tissue 22 can be considered a weakly scattering phase object, having limited amplitude contrast modulation under brightfield illumination. The sample may involve frozen sections or paraffin (wax) sections. The tissue sample 22 may be fixed (e.g., using formalin) or unfixed. The tissue sample 22 may include mammalian (e.g., human or animal) tissue or plant tissue. The sample 22 may include other biological samples, environmental samples, and the like.

Examples include particles, cells, cell organelles, or other micro-scale objects (those with micrometer-sized dimensions or smaller).

The trained, deep neural network 10 in response to input image 21 the outputs or generates a digitally stained or labelled output image 40. The digitally stained output image 40 has "staining" that has been digitally integrated into the stained output image 40 using the trained, deep neural network 10. In some embodiments, such as those involved tissue sections, the trained, deep neural network 10 appears to a skilled observer (e.g., a trained histopathologist) to be substantially equivalent to a corresponding brightfield image of the same tissue section sample 22 that has been chemically stained. This digital or virtual staining of the tissue section sample 22 appears just like the tissue section sample 22 had undergone histochemical staining even though no such staining operation was conducted.

Figure 2:
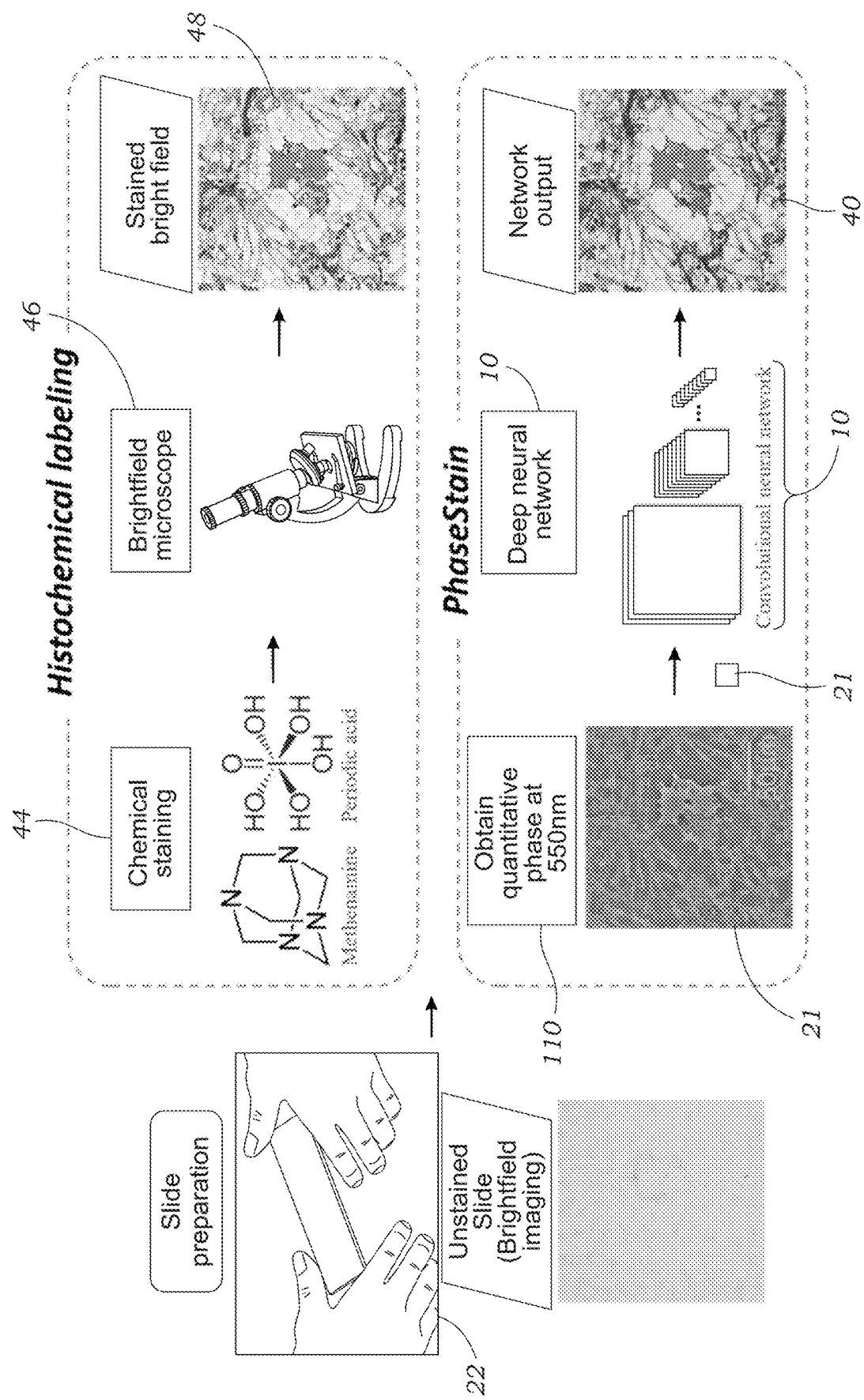
FIG. 2 illustrates a schematic representation of the deep learning-based digital/virtual histology staining operations using a quantitative phase image of unstained tissue.

FIG. 2 schematically illustrates the operations involved in the PhaseStain platform or method that uses quantitative phase images 21. In this embodiment, a sample 22 is prepared which may include an unstained tissue section sample 22 (or other type of sample 22). FIG. 2 illustrates in the bottom a sequence of operations that obtains a quantitative phase image 21 of the unstained tissue section sample 22 using a quantitative phase microscope device 110. This quantitative phase image 21 is then input to the trained, deep neural network 10 (illustrated as a CNN) to output a digitally stained image 40 of the tissue section sample 22. Of course, in this embodiment, the deep neural network 10 is trained using "gold standard" histochemical stained sections along with training images or image patches (described herein) obtained using the quantitative phase microscope device 110. The digitally stained image 40 may be shown on a computer monitor 106 or other display as is described herein. FIG. 2 also illustrates in the upper sequence the conventional operations whereby the tissue section sample 22 is subject to histochemical staining 44 followed by conventional brightfield microscopic imaging 46 to generate a conventional brightfield image 48 of the stained tissue section sample 22. As seen in FIG. 2, the digitally stained image 40 closely resembles the actual chemically stained image 48. Similar resolution and color profiles are obtained using the digital staining system and method described herein.

Figure 3:
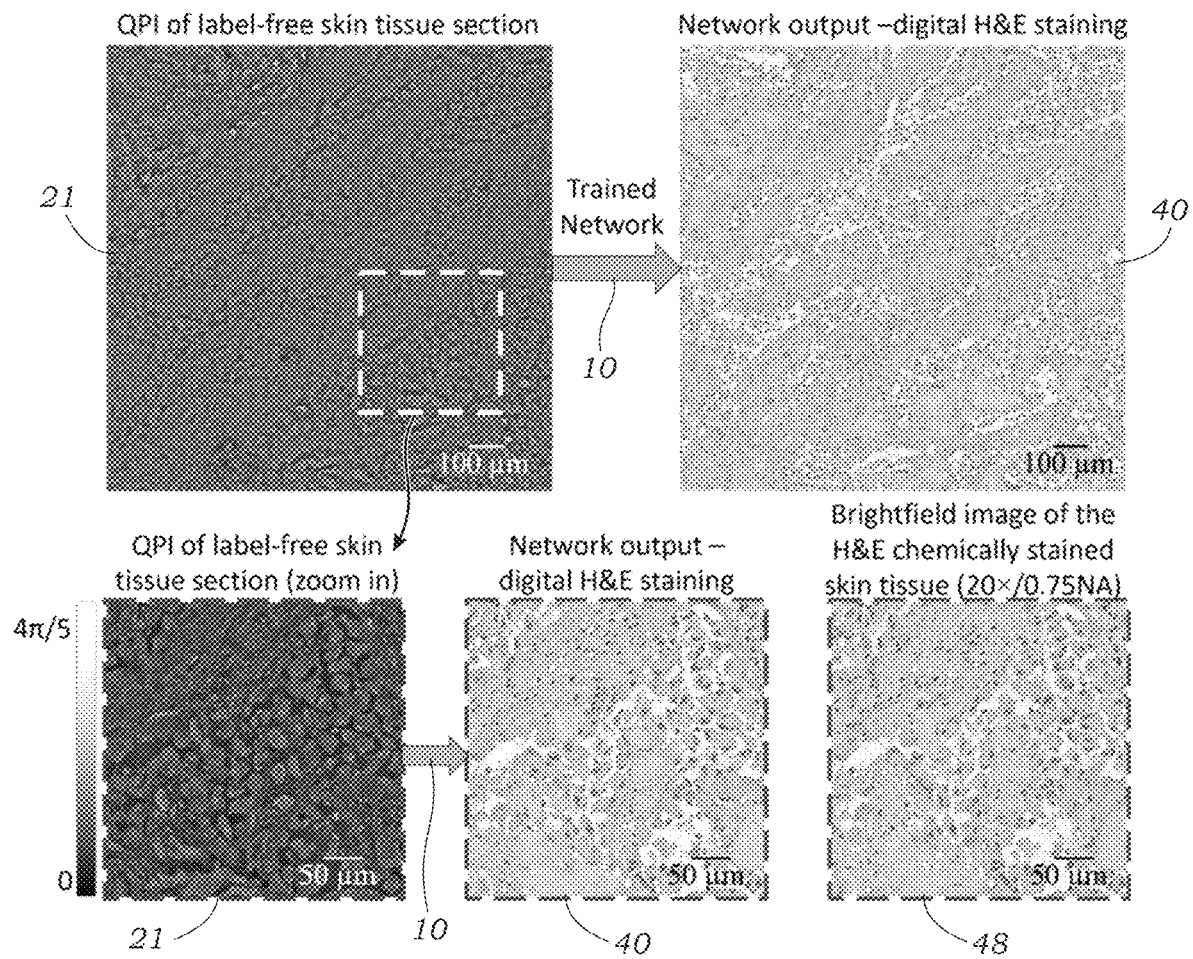
FIG. 3 illustrates digital/virtual H&E stained images of label-free skin tissue using the PhaseStain framework. The trained deep neural network output of the digitally stained H&E is very close to the standard brightfield image of H&E chemically stained skin tissue (right, lower panel image).
Figure 4:
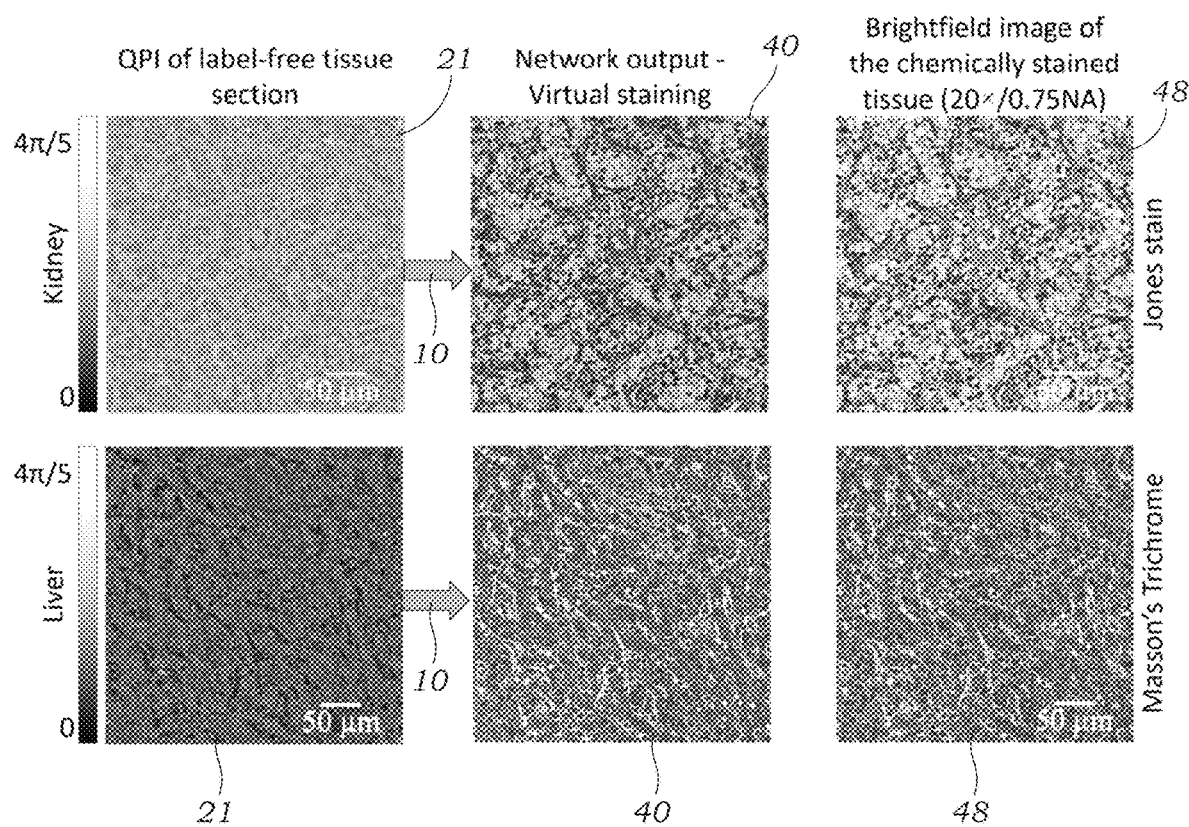
FIG. 4 illustrates the PhaseStain based digital/virtual stained images of label-free kidney tissue (Jones' stain) and liver tissue (Masson's Trichrome).

Experimental-Digital Staining of Label Free Tissue Using Quantitative Phase Imaging (QPI) ("PhaseStain Embodiment")
Results Three (3) trained, deep neural networks 10 were used, which correspond to the three (3) different combinations of tissue and stain types, i.e., H&E for skin tissue, Jones' stain for kidney tissue and Masson's trichrome for liver tissue (other stain/dye tissue combinations may also be used herein). Following the training phase, these three (3) trained deep neural networks 10 were blindly tested on holographically reconstructed quantitative phase images 21 that were not part of the network's training set. FIG. 3 shows the results for digital/virtual H&E staining of a phase image 21 of a label-free skin tissue section 22 (showing output image 40), which confirms discohesive tumor cells lining papillary structures with dense fibrous cores. Additional results for the digital/virtual staining of quantitative phase images 21 of label-free tissue sections 22 are illustrated in FIG. 4 (showing output image 40), for kidney (digital Jones' staining) and liver (digital Masson's Trichrome staining). These digitally/virtually stained quantitative phase images 40 show sheets of clear tumor cells arranged in small nests with a delicate capillary bed for the kidney tissue section, and a virtual trichrome stain highlighting normal liver architecture without significant fibrosis or inflammation, for the liver tissue section.

These deep learning-based digital/virtual staining results presented in FIGS. 3 and 4 visually demonstrate the high-fidelity performance of the GAN-based deep neural network 10. To further shed light on this comparison between the PhaseStain images 40 and the corresponding brightfield images 48 of the chemically stained tissue samples, the structural similarity (SSIM) index of these two sets of images using:

$$SSIM(U_1, U_2) = \frac{1}{3} \sum_{i=1,2,3} \frac{(2\mu_{1,i}\mu_{2,i} + 2\sigma_{1,2,i} + c_2)}{(\mu_{1,i}^2 + \mu_{2,i}^2 + c_1)(\sigma_{1,i}^2 + \sigma_{2,i}^2 + c_2)} \quad (1)$$

where $U_1$, $U_2$ are the PhaseStain output images 40 and the corresponding brightfield reference image 48, respectively, $\mu_{k,i}$ and $\sigma_{k,i}$ are the mean and the standard deviation of each image $U_k$ (k=1,2), respectively, and index i refers to the RGB channels of the images. The cross-variance between the i-th image channels is denoted with $\sigma_{1,2,i}$ and $c_1$, $c_2$ are stabilization constants used to prevent division by a small denominator. The result of this analysis revealed that the SSIM was 0.8113, 0.8141 and 0.8905, for the digital/virtual staining results corresponding to the skin, kidney and liver tissue samples, respectively, where the analysis was performed on ~10 Megapixel images, corresponding to a field-of-view (FOV) of ~1.47 mm² for each sample 22.

Figure 5A:
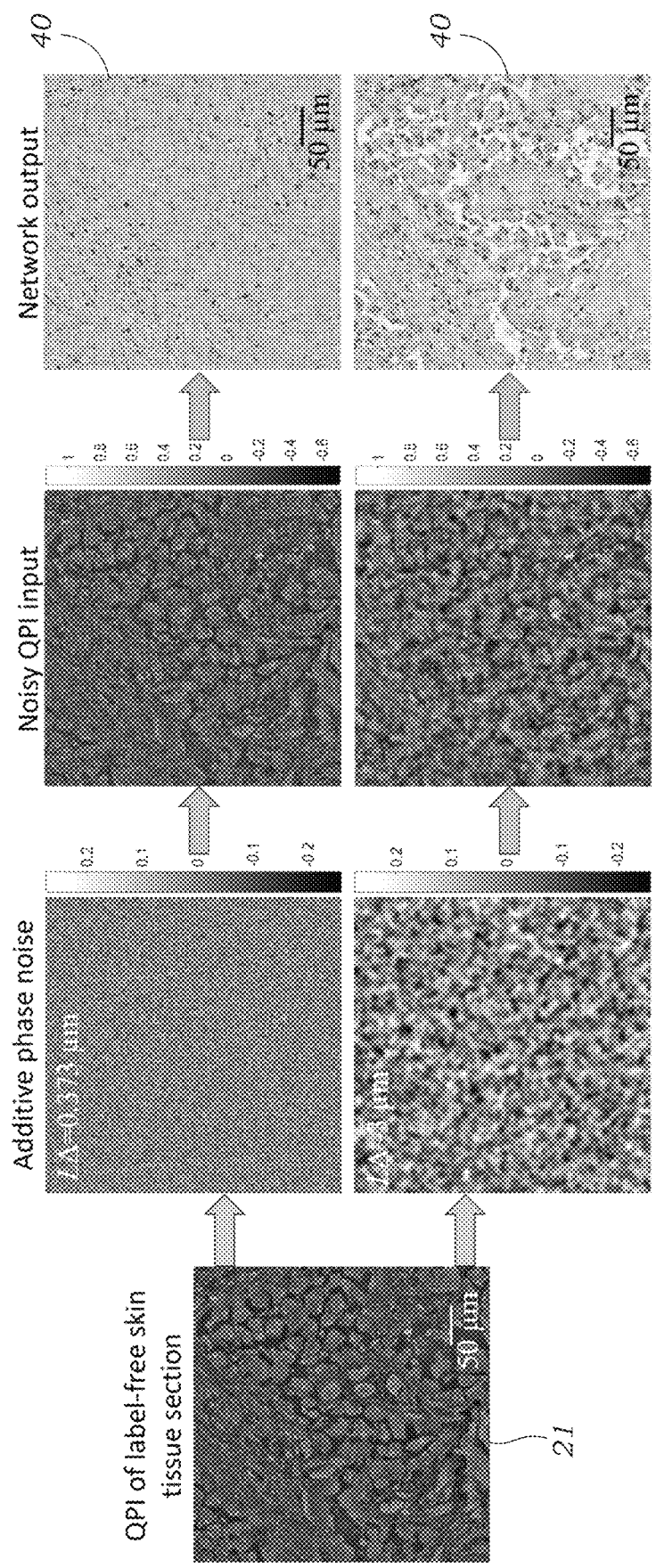
FIG. 5A illustrates PhaseStain results for noisy phase input images (ground truth shown in FIG. 3). Top row: L$\Delta$~0.373 µm; second row: L$\Delta$~3 µm.

Next, to evaluate the sensitivity of the deep neural network 10 output to phase noise in the measurements obtained, a numerical experiment was performed on the quantitative phase image of a label-free skin tissue, where noise was added in the following manner:

$$\tilde{\phi}(m, n) = \phi(m, n) + \delta\phi(m, n) = \phi(m, n) + \beta r(m, n) * \frac{1}{2\pi L^2} \exp\{-(m^2 + n^2)\Delta^2 / [2(L\Delta)^2]\}, \quad (2)$$

where $\tilde{\phi}$ is the resulting noisy phase distribution (i.e., the image under test), $\phi$ is the original phase image of the skin tissue sample, r is drawn from a normal distribution N(0.1), β is the perturbation coefficient, L is the Gaussian filter size/width and Δ is the pixel size, which spatially smoothens the random noise into isotropic patches, as shown in FIG. 5A. These parameters were chosen such that the overall phase signal-to-noise-ratio (SNR) is statistically identical for all the cases and made sure that no phase wrapping occurs. Ten (10) random realizations were used of this noisy phase image for four (4) combinations of (β, L) values to generate $\tilde{\phi}$ which was used as input to the trained deep neural network 10.

Figure 5B:
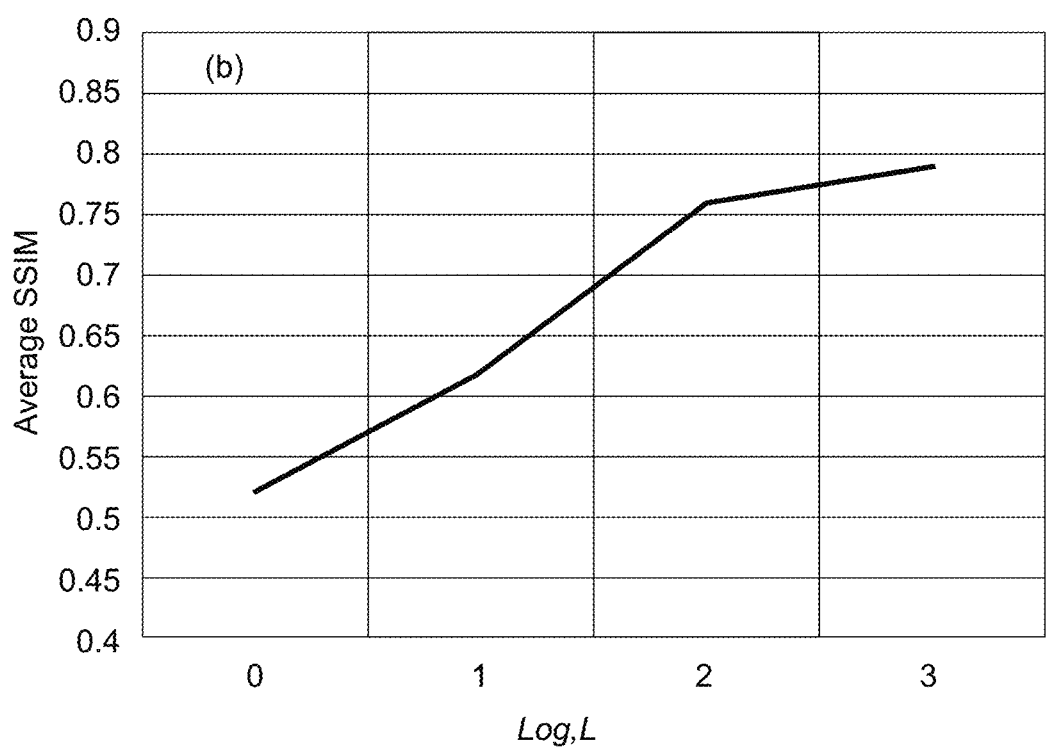
FIG. 5B illustrates the analysis of the impact of phase noise on the inference quality of PhaseStain (quantified using SSIM), as a function of the Gaussian filter length, L.

The deep network inference fidelity for these noisy phase inputs is reported in FIGS. 5A and 5B, which reveals that it is indeed sensitive to local phase variations and related noise, and it improves its inference performance as one spatially extends the filter size, L (while the SNR remains fixed). In other words, the PhaseStain network output is more impacted by small scale variations, corresponding to e.g., the information encoded in the morphology of the edges or refractive index discontinuities (or sharp gradients) of the sample 22. It was also found that for a kernel size of $L\Delta \sim 3$ μm, the SSIM remains unchanged (~0.8), across a wide range of perturbation coefficients, β. This result implies that the deep neural network 10 is less sensitive to sample preparation imperfections, such as height variations and wrinkles in the thin tissue section 22, which naturally occur during the preparation of the tissue section.

The training process of a PhaseStain deep neural network 10 needs to be performed only once, following which, the newly acquired quantitative phase images 21 of various samples 22 are blindly fed to the pre-trained deep neural network 10 to output a digitally-stained image 40 for each label-free sample 22, corresponding to the image 48 of the same sample FOV, as it would have been imaged with a brightfield microscope, following the chemical staining process. In terms of the computation speed, the digital/virtual staining using PhaseStain takes 0.617 sec on average, using a standard desktop computer 100 equipped with a dual-GPU for a FOV of ~0.45 $mm^2$, corresponding to ~3.22 Megapixels. This fast inference time (e.g., less than one second), even with relatively modest computers, means that the PhaseStain deep neural network 10 can be easily integrated with a QPI-based whole slide scanner 110, since the deep neural network 10 can output virtually stained images 40 in small patches while the tissue sample 22 is still being scanned by an automated microscope 110, to simultaneously create label-free QPI and digitally-stained whole slide images 40 of the samples 22.

While three (3) different deep neural networks 10 were used to obtain optimal results for specific tissue and stain combinations, this does not pose a practical limitation for PhaseStain, since a more general staining deep neural network 10 may be used for a specific stain type (e.g. H&E, Jones' stain etc.) using multiple tissue types stained with it, at the cost of increasing the network size as well as the training and inference times. It is important to note that, in addition to the lens-free holographic microscope that was used to obtain the images, the PhaseStain framework can also be applied to virtually-stain the resulting images of various other QPI techniques, regardless of their imaging configuration, modality, specific hardware or phase recovery method that are employed.

Figure 6:
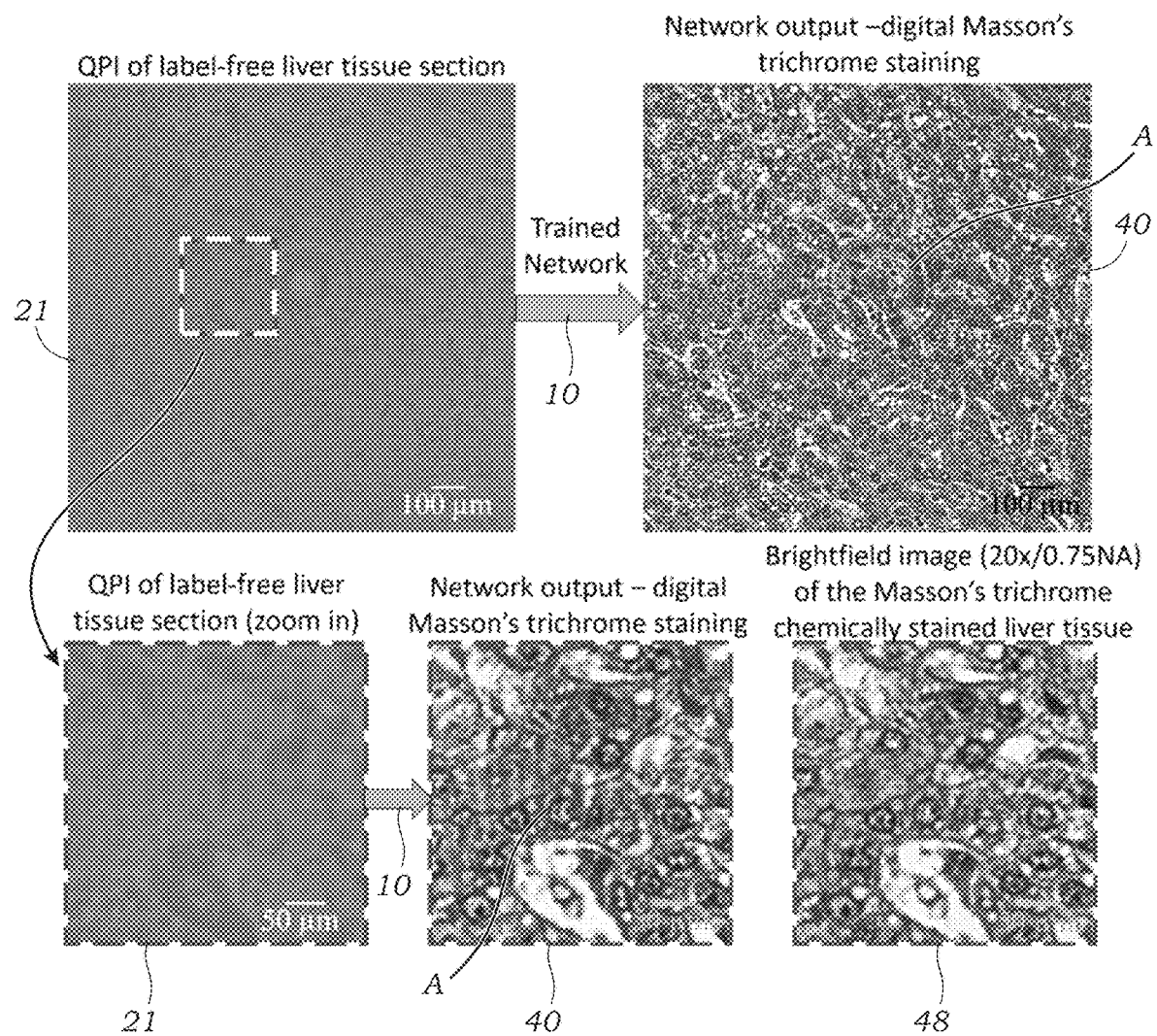
FIG. 6 illustrates the impact of holographic fringes (A) (seen in the central region of the upper right image) resulting from out-of-focus particles on the deep neural network's digital staining performance. The Zoomed in region (dashed line) illustrates the holographic fringes in closer detail.

One of the disadvantages of coherent imaging systems is "coherence-related image artifacts", such as e.g., speckle noise, or dust or other particles creating holographic interference fringes, which do not appear in incoherent brightfield microscopy images of the sample samples. In FIG. 6, image distortions (A) in the output image 40 are seen are created, for example, by out-of-focus particles. To reduce such distortions (a) in the network output images 40, coherence-related image artifacts resulting from out-of-focus particles can be digitally removed by using a recently introduced deep learning-based hologram reconstruction method, which learns, through data, to attack or eliminate twin-image artifact as well as interference fringes resulting from out-of-focus or undesired objects.

While the experimental results demonstrated the applicability of PhaseStain approach to fixed paraffin-embedded tissue specimens 22, the approach is also applicable to frozen tissue sections 22, involving other tissue fixation methods as well. Also, while the method was demonstrated for thin tissue sections 22, QPI has been shown to be valuable to image cells and smear samples (including, for example, blood and Pap smears), and PhaseStain techniques would also be applicable to digitally stain these types of specimens 22.

Materials and Methods

Sample Preparation and Imaging

All the samples that were used were obtained from the Translational Pathology Core Laboratory (TPCL) and were prepared by the Histology Lab at UCLA. They were obtained after de-identification of the patient related information and were prepared from existing specimen. Therefore, this work did not interfere with standard practices of care or sample collection procedures.

Following formalin-fixing paraffin-embedding (FFPE), the tissue block is sectioned using a microtome into ~2-4 μm thick sections. This step is only needed for the training phase, where the transformation from a phase image into a brightfield image needs to be statistically learned by the deep neural network 10. These tissue sections are then deparaffinized using Xylene and mounted on a standard glass slide using Cytoseal™ (Thermo-Fisher Scientific, Waltham, MA USA), followed by sealing of the specimen 22 with a coverslip. In the learning/training process, this sealing step presents several advantages: protecting the sample 22 during the imaging and sample handling processes, also reducing artifacts such as e.g., sample thickness variations.

Following the sample preparation, the specimen 22 was imaged using an on-chip holographic microscope 110 to generate a quantitative phase image. Following the QPI process, the label-free specimen slide was put into Xylene for ~48 hours, until the coverslip can be removed without introducing distortions to the tissue. Once the coverslip is removed the slide was dipped multiple times in absolute alcohol, 95% alcohol and then washed in D.I. water for ~1 min. Following this step, the tissue slides were stained with H&E (skin tissue), Jones' stain (kidney tissue) and Masson's trichrome (liver tissue) and then cover slipped. These tissue samples were then imaged using a brightfield automated slide scanner microscope (Aperio AT, Leica Biosystems) with a 20×/0.75NA objective (Plan Apo), equipped with a 2× magnification adapter, which results an effective pixel size of ~0.25 μm.

Quantitative Phase Imaging

Lens-free imaging setup: Quantitative phase images of label-free tissue samples were acquired using an in-line lens-free holography setup as described in Greenbaum et al., Wide-field computational imaging of pathology slides using lens-free on-chip microscopy, Sci. Transl. Med. 6, 267ra175-267ra175 (2014), which is incorporated by reference. A light source (WhiteLase Micro, NKT Photonics) with a center wavelength at 550 nm and a spectral bandwidth of ~2.5 nm was used as the illumination source. The uncollimated light emitted from a single-mode fiber was used for creating a quasi-plane-wave that illuminated the sample 22. The sample 22 was placed between the light source and the CMOS image sensor chip (IMX 081, Sony, pixel size of 1.12 μm) with a source-to-sample distance ($z_1$) of 5~10 cm and a sample-to-sensor distance ($z_2$) of 1-2 mm. This on-chip lens-free holographic microscope 110 has submicron resolution with an effective pixel size of 0.37 μm, covering a sample FOV of ~20 $mm^2$ (which accounts for the entire active area of the sensor). The positioning stage (MAX606, Thorlabs, Inc.), that held the CMOS sensor, enabled 3D translation of the imager chip for performing pixel super-resolution (PSR) and multi-height based iterative phase recovery. All imaging hardware was controlled automatically by LabVIEW software.

Pixel super-resolution (PSR) technique: To synthesize a high-resolution hologram (with a pixel size of ~0.37 μm) using only the G1 channel of the Bayer pattern (R, G1, G2, and B), a shift-and-add based PSR algorithm was applied such as described in Bishara et al., Lensfree on-chip microscopy over a wide field-of-view using pixel super-resolution, Opt. Express 18, 11181 (2010), which is incorporated by reference herein. The translation stage that holds the image sensor was programmed to laterally shift on a 6×6 grid with sub-pixel spacing at each sample-to-sensor distance. A low-resolution hologram was recorded at each position and the lateral shifts were precisely estimated using a shift estimation algorithm. This step results in 6 non-overlapping panels that were each padded to a size of 4096×4096 pixels, and were individually phase-recovered, which is detailed next.

Multi-height phase recovery: Lens-free in-line holograms at eight sample-to-sensor distances were captured. The axial scanning step size was chosen to be 15 μm. Accurate z-steps were obtained by applying a holographic autofocusing algorithm based on the edge sparsity criterion ("Tamura of the gradient", i.e., ToG). A zero-phase was assigned to the object intensity measurement as an initial phase guess, to start the iterations. An iterative multi-height phase recovery algorithm described in Greenbaum et al., Maskless imaging of dense samples using pixel super-resolution based multi-height lensfree on-chip microscopy, Opt. Express 20, 3129 (2012), incorporated by reference herein, was then used by propagating the complex field back and forth between each height using the transfer function of free-space. During this iterative process, the phase was kept unchanged at each axial plane, where the amplitude was updated by using the square-root of the object intensity measurement. One iteration was defined as propagating the hologram from the $8^{th}$ height (farthest from the sensor chip) to the 1st height (nearest to the sensor) then back propagating the complex field to the $8^{th}$ height. Typically, after 10-30 iterations the phase is retrieved. For the final step of the reconstruction, the complex wave defined by the converged amplitude and phase at a given hologram plane was propagated to the object plane, from which the phase component of the sample was extracted.

Data Preprocessing and Image Registration

Figure 7:
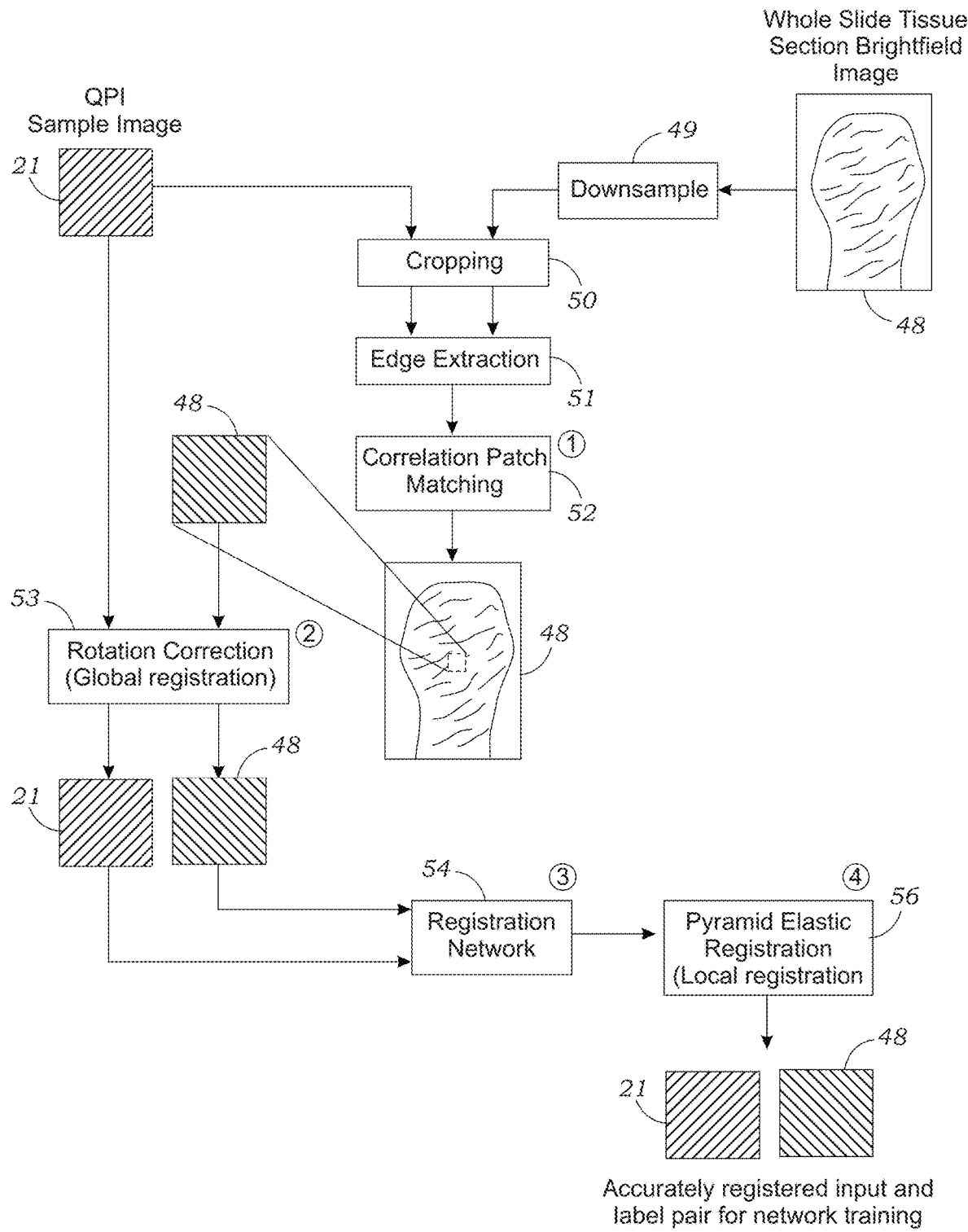
FIG. 7 illustrates the field-of-view matching and registration process of the QPI images of unstained tissue samples with respect to the brightfield images of the same samples, after the chemical staining process.

An important step in the training process of the deep neural network 10 is to perform an accurate image registration, between the two imaging modalities (QPI and brightfield), which involves both global matching and local alignment steps as illustrated in FIG. 7. Since the network 10 aims to learn the transformation from a label-free phase retrieved image 21 to a histochemically-stained brightfield image 48, it is crucial to accurately align the FOVs for each input and target image pair in the dataset. This cross-modality alignment procedure is done in four steps: steps 1,2 and 4 are done in Matlab (The Math Works Inc., Natick, MA, USA) and step 3 involves TensorFlow.

The first step is to find a roughly matched FOV between QPI and the corresponding brightfield image. This is done by first bicubic down-sampling 49 the whole slide image (WSI) (~60 k by 60 k pixels) to match the pixel size of the phase retrieved image. Then, each 4096×4096-pixel phase image was cropped 50 by 256 on each side (resulting in an image with 3584×3584 pixels) to remove the padding that is used for the image reconstruction process. Following this step, both the brightfield and the corresponding phase images are edge extracted 51 using the Canny method, which uses double threshold to detect strong and weak edges on the gradient of the image. Then, a correlation score matrix is calculated by correlating each 3584×3584-pixel patch of the resulting edge image to the same size as the image extracted from the brightfield edge image. The image with the highest correlation score indicates a match between the two images (operation 52 in FIG. 7), and the corresponding brightfield image is cropped out from the WSI. Following this initial matching procedure, the quantitative phase image 21 and the brightfield microscope images 48 are coarsely matched.

The second step (operation 53 in FIG. 7) is used to correct for potential rotations, aberrations, or small perturbations of the sample that exist between these coarsely matched image pairs, which might be caused by a slight mismatch in the sample placement during the two image acquisition experiments (which are performed on different imaging systems, holographic vs. brightfield). This intensity-based registration step correlates the spatial patterns between the two images: phase image that is converted to unsigned integer format and the luminance component of the brightfield image were used for this multimodal registration framework implemented in Matlab. The result of this digital procedure is an affine transformation matrix, which is applied to the brightfield microscope image patch, to match it with the quantitative phase image of the same sample. Following this registration step, the phase and the corresponding brightfield images are globally aligned. A further crop of 64 pixels on each side to the aligned image pairs is used to accommodate for a possible rotation angle correction.

The third step involves the training of a separate neural network 54 that roughly learns the transformation from quantitative phase images into stained brightfield images, which can help the distortion correction between the two image modalities in the fourth/final step. This neural network 54 has the same structure as the network that was used for the final training process with the input and target images obtained from the second registration step discussed earlier. Since the image pairs are not well aligned yet, the training is stopped early at only ~2000 iterations to avoid a structural change at the output to be learnt by the network 54. The output and target images of the network are then used as the registration pairs in the fourth step, which is an elastic image registration algorithm 56, used to correct for local feature registration.

GAN Architecture and Training

Figure 8:
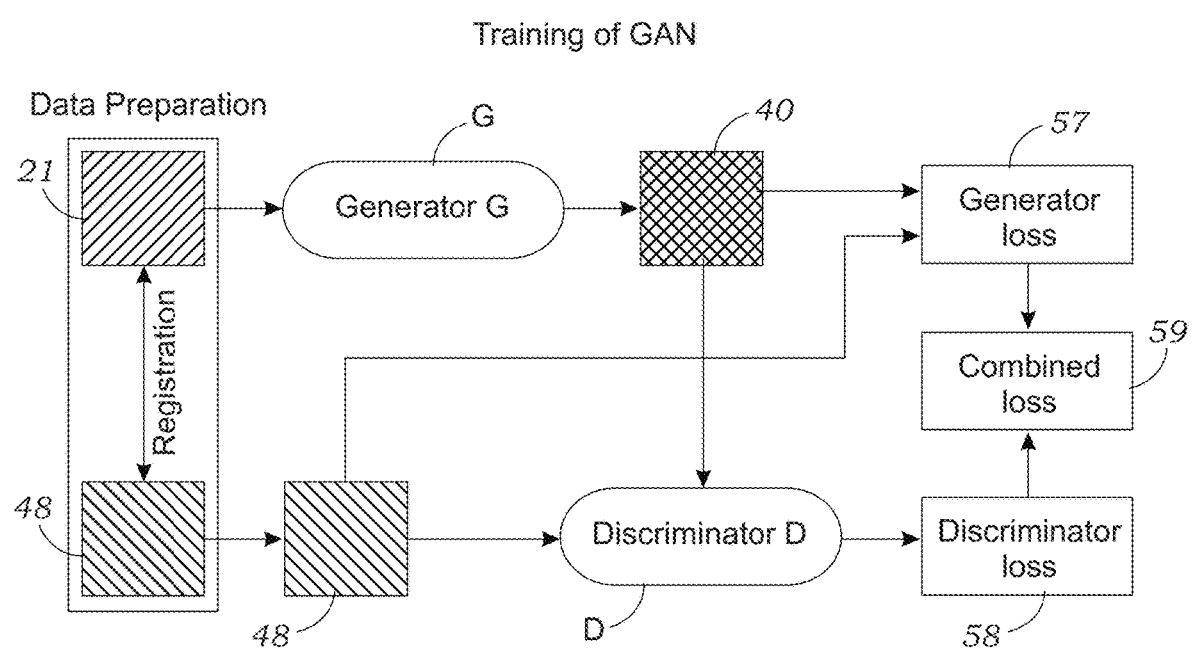
FIG. 8 schematically illustrates the training process of the virtual staining network using a GAN.
Figure 9A:
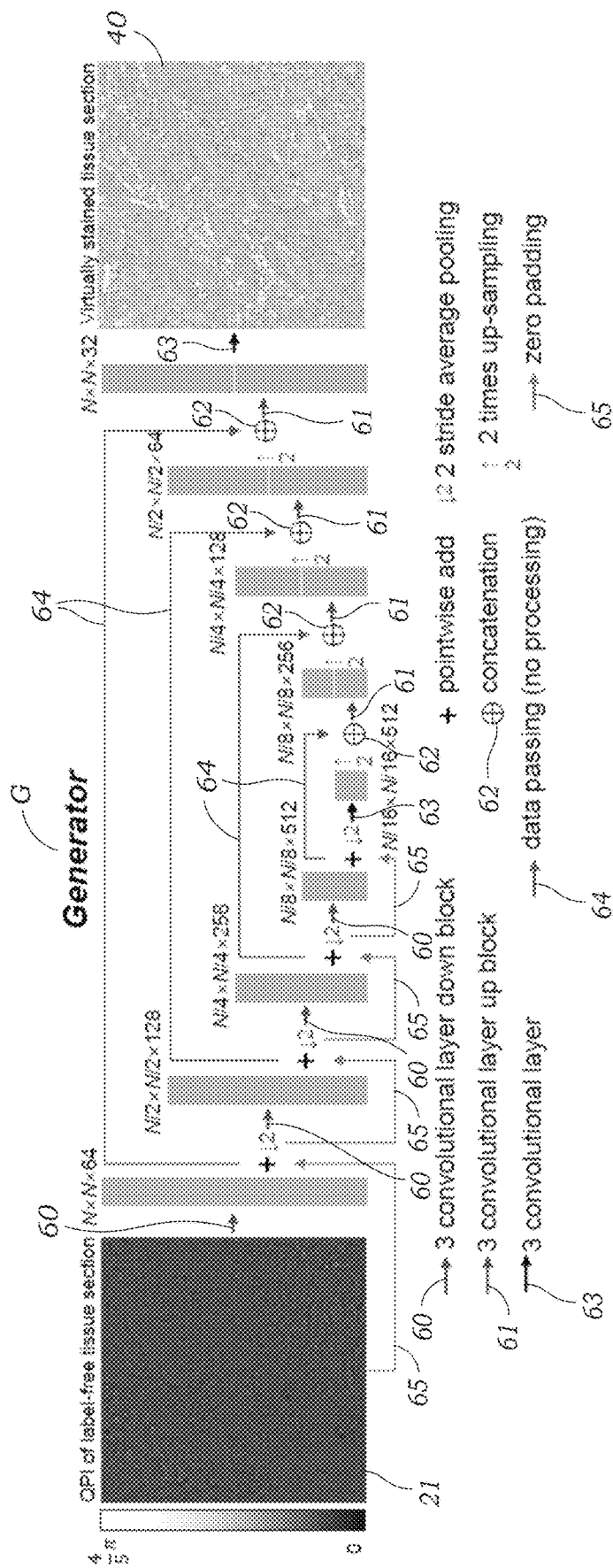
FIGS. 9A and 9B illustrates the GAN architecture according to one embodiment.
Figure 9B:
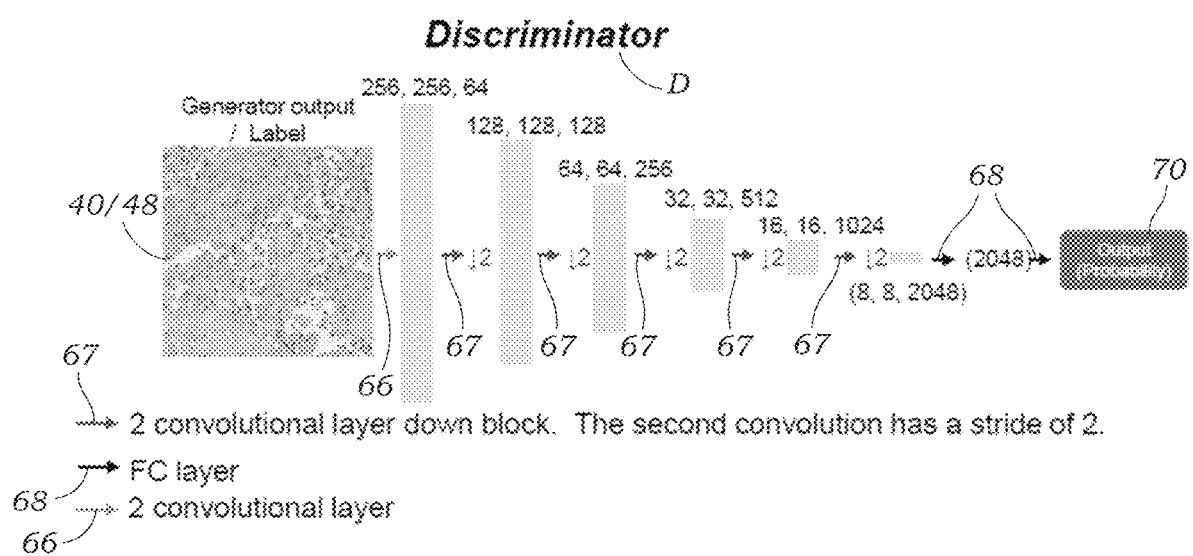

The GAN architecture that was used for PhaseStain is detailed in FIGS. 9A and 9B. Following the registration of the label-free quantitative phase images 21 to the brightfield images 48 of the histochemically stained tissue sections, these accurately aligned fields-of-view were partitioned to overlapping patches of 256×256 pixels, which were then used to train the GAN-based deep neural network 10. The GAN is composed of two deep neural networks, a generator G and a discriminator D as seen in FIG. 8. The discriminator network's loss function is given by:

$$l_{discriminator}=D(G(x_{input}))^2+(1-D(z_{label}))^2 \qquad (3)$$

where D(·) and G(·) refer to the discriminator and generator network operator, $x_{input}$ denotes the input to the generator, which is the label-free quantitative phase image, and $z_{label}$ denotes the brightfield image of the chemically stained tissue. The generator network, G, tries to generate an output image with the same statistical features as $z_{label}$, while the discriminator, D, attempts to distinguish between the target and the generator output images. The ideal outcome (or state of equilibrium) will be when the generator's output and target images share an identical statistical distribution, where in this case, $D(G(x_{input}))$ should converge to 0.5. As seen in FIG. 8, the Generator G is associated with a Generator loss 57 and the Discriminator D is associated with a Discriminator loss 58 that combine for a combined loss 59. For training of the GAN, a goal is to minimize this combined loss 59. For the generator deep network, the loss function was defined as:

$$l_{generator} = L_1\{z_{label}, G(x_{input})\} + \lambda \times TV\{G(x_{input})\} + \alpha \times (1 - D(G(x_{input})))^2 \quad (4)$$

where $L_1\{\cdot\}$ term refers to the absolute pixel by pixel difference between the generator output image and its target, $TV\{\cdot\}$ stands for the total variation regularization that is being applied to the generator output, and the last term reflects a penalty related to the discriminator network prediction of the generator output. The regularization parameters ($\lambda$, $\alpha$) were set to 0.02 and 2000 so that the total variation loss term, $\lambda \times TV\{G(x_{input})\}$, was ~2% of the $L_1$ loss term, and the discriminator loss term, $\alpha \times (1-D(G(x_{input})))^2$ was ~98% of the total generator loss, $l_{generator}$.

For the Generator deep neural network G (FIG. 9A), the architecture used a down-sampling and an up-sampling path, with each path containing four (4) blocks forming four (4) distinct levels. In the down-sampling path 60, each residual block consists of three (3) convolutional layers and three (3) leaky rectified linear (LReLU) units used as an activation function, which is defined as:

$$LReLU(x) = \begin{cases} x & \text{for } x > 0 \\ 0.1x & \text{otherwise} \end{cases} \quad (5)$$

At the output of each block, the number of channels is 2-fold increased (except for the first block that increases from one (1) input channel to sixty-four (64) channels). Blocks are connected by an average-pooling layer of stride 2 ($\downarrow 2$) that down-samples the output of the previous block by a factor of 2 for both horizontal and vertical dimensions.

In the up-sampling path 61, each block also consists of three (3) convolutional layers and three (3) LReLU activation functions, which decrease the number of channels at its output by 4-fold. Blocks are connected by a bilinear up-sampling layer ($\uparrow 2$) that up-samples the size of the output from the previous block by a factor of 2 for both lateral dimensions. A concatenation function 62 with the corresponding feature map from the down-sampling path of the same level is used to increase the number of channels from the output of the previous block by 2. The two paths are connected in the first level of the network by a convolutional layer 63 which maintains the number of the feature maps from the output of the last residual block in the down-sampling path. The last layer is a convolutional layer that maps the output of the up-sampling path into three (3) channels of the YCbCr color map. Arrows 64 represent data passing with no processing while arrows 65 represent zero padding.

The discriminator network D (FIG. 9B) consists of one convolutional layer 66, five (5) discriminator blocks 67, an average pooling layer of stride 2 ($\downarrow 2$) and two fully connected layers 68. The first convolutional layer 66 receives three (3) channels (YCbCr color map) from either the generator output 40 or the target 48, and increases the number of channels to sixty-four (64). The discriminator blocks consist of two (2) convolutional layers with the first layer maintaining the size of the feature map and the number of channels, while the second layer increases the number of channels by 2-fold and decreases the size of the feature map by 4-fold. The average pooling layer ($\downarrow 2$) has a filter size of 8×8, which results in a matrix with a size of (B, 2048), where B refers to the batch size. The output of this average pooling layer ($\downarrow 2$) is then fed into two fully connected layers 68 with the first layer maintaining the size of the feature map, while the second layer decreases the output channel to 1, resulting in an output size of (B, 1). The output 70 of this fully 68 connected layer is going through a sigmoid function indicating the probability that the 3-channel discriminator input is drawn from a chemically stained brightfield image. For the discriminator network D, all the convolutional layers and fully connected layers are connected by LReLU nonlinear activation functions.

Throughout the training, the convolution filter size was set to be 3×3. For the patch generation, data augmentation was applied by using 50% patch overlap for the liver and skin tissue images, and 25% patch overlap for the kidney tissue images (see Table 1 below). The learnable parameters including filters, weights and biases in the convolutional layers and fully connected layers are updated using an adaptive moment estimation (Adam) optimizer with learning rate $1\times 10^{-4}$ for the generator network and $1\times 10^{-5}$ for the discriminator network.

TABLE 1

| Tissue type | # of iterations | # of patches (256 × 256 pixels) | Training time (hours) | # of epochs |
|---|---|---|---|---|
| Liver | 7500 | 2500 training/625 validation | 11.076 | 25 |
| Skin | 11000 | 2500 training/625 validation | 11.188 | 18 |
| Kidney | 13600 | 2312 training/578 validation | 13.173 | 39 |

Table 1: training details for virtual staining of different tissue types using PhaseStain. Following the training, blind inference takes ~0.617 s for a FOV of ~0.45 mm², corresponding to ~3.22 Megapixels.

For each iteration of the discriminator, there were v iterations of the generator network; for liver and skin tissue training, v=max(5, floor(7−w/2)) w was increased by 1 for every 500 iterations (w was initialized as 0). For the kidney tissue training, v=max(4, floor(6−w/2)) where w was increased by 1 for every 400 iteration. This helped train the discriminator not to overfit to the target brightfield images. A batch size of 10 was used for the training of liver and skin tissue sections, and 5 for the kidney tissue sections. The network's training stopped when the validation set's $L_1$-loss did not decrease after 4000 iterations.

Implementation Details

The number of image patches that were used for training, the number of epochs and the training schedules are shown in Table 1. The deep neural network 10 was implemented using Python version 3.5.0, with TensorFlow framework version 1.7.0. The software was run on a desktop computer with a Core i7-7700K CPU (@) 4.2 GHz (Intel) and 64 GB of RAM, running a Windows 10 operating system (Microsoft). Following the training for each tissue section, the corresponding deep neural network 10 was tested with four (4) image patches of 1792×1792 pixels with an overlap of ~7%. The outputs of the network were then stitched to form the final network output image of 3456×3456 pixels (FOV~1.7 mm²), as shown in e.g., FIGS. 2-4. The network training and testing were performed using dual GeForce® GTX 1080Ti GPUs (NVidia).

While embodiments of the present invention have been shown and described, various modifications may be made without departing from the scope of the present invention. The invention, therefore, should not be limited, except to the following claims, and their equivalents.

What is claimed is:

1. A microscopy method for label-free samples comprising:

providing a trained, deep neural network that is executed by image processing software using one or more processors, wherein the trained, deep neural network is trained with a plurality of matched chemically stained images or image patches and their corresponding quantitative phase microscopy images or image patches of the same sample with quantitative phase information of the sample;

inputting a quantitative phase microscopy image of the label-free sample to the deep neural network trained to process quantitative phase information; and outputting a digitally stained brightfield output image of the sample that is substantially equivalent to a corresponding brightfield image of the same sample that has been chemically stained.

2. The microscopy method of claim 1, wherein the trained, deep neural network is trained with one or more ground truth images of chemically stained samples along with a training set of label-free sample images or image patches of the same sample, which are used to set or fine tune parameters for the deep neural network.

3. The microscopy method of any of claim 2, wherein the ground truth images of the chemically stained sample comprise human, animal or plant tissue samples stained with a preselected stain or a mixture of stains.

4. The microscopy method of claim 1, wherein the trained, deep neural network is trained using a plurality of training images or image patches of samples of the same type as the label-free sample being imaged.

5. The microscopy method of claim 1, wherein the trained, deep neural network is trained using a plurality of training images or image patches of samples of a different type compared to the label-free samples being imaged.

6. The microscopy method of claim 1, wherein the quantitative phase microscopy image comprises a holographic microscopy image.

7. The microscopy method of claim 1, wherein the quantitative phase microscopy image comprises a lens-free microscopy image.

8. The microscopy method of claim 1, wherein the quantitative phase microscopy image comprises a lens-based microscopy image.

9. The microscopy method of claim 1, wherein the quantitative phase microscopy image comprises a computational microscopy image.

10. The microscopy method of claim 2, wherein the ground truth images of chemically stained sample and the training set of label-free sample images are registered to one another using global registration for rotational or aberration correction followed by local registration for distortion correction.

11. The microscope method of claim 10, wherein local registration comprises using an elastic image registration algorithm.

12. The microscopy method of claim 1, wherein the trained, deep neural network comprises a convolutional neural network (CNN).

13. The microscopy method of claim 12, wherein the CNN is a GAN-trained model or deep neural network.

14. The microscopy method of claim 1, wherein the sample comprises tissue, cells, pathogens, biological fluid smears, or other micro-objects of interest.

15. A system for outputting digitally stained images of a sample obtained by a quantitative phase microscope device, the system comprising:

a computing device having image processing software executed thereon or thereby, the image processing software comprising a trained, deep neural network that is executed using one or more processors of the computing device, wherein the trained deep neural network is trained with one or more ground truth images or image patches of chemically stained samples along with a training set of label-free images or image patches obtained of the same samples with quantitative phase information obtained from the quantitative phase microscope device that are used to set or fine tune parameters for the deep neural network, the trained, deep neural network configured to receive a quantitative phase microscopy input image of the label-free sample and output a digitally stained brightfield output image of the sample that is substantially equivalent to a corresponding brightfield image of the same sample that has been chemically stained.

16. The system of claim 15, wherein the quantitative phase microscope device comprises a holographic microscope device, a lens-free microscope device, a lens-based microscope device, or a computational microscope.

17. The system of claim 15, wherein the computing device comprises a personal computer, mobile computer, laptop, server, or one or more graphics processing units (GPUs).

* * * * *